(12) United States Patent
Sauterleute

(10) Patent No.: US 6,199,387 B1
(45) Date of Patent: Mar. 13, 2001

(54) AIR-CONDITIONING SYSTEM FOR AIRPLANE CABIN

(75) Inventor: Alfred Sauterleute, Heimenkirch (DE)

(73) Assignee: Liebherr-Aerospace Lindenberg GmbH, Lindenberg (DE)

(*) Notice: Subject to any disclaimer, the term of this patent is extended or adjusted under 35 U.S.C. 154(b) by 0 days.

(21) Appl. No.: 09/364,144

(22) Filed: Jul. 30, 1999

(51) Int. Cl.[7] ................................................. F25B 9/00
(52) U.S. Cl. ................................................................ 62/87
(58) Field of Search .......................................... 62/87, 402

(56) References Cited

U.S. PATENT DOCUMENTS

| Re. 32,100 | 4/1986 | Rannenberg . |
| 3,289,436 | 12/1966 | Groves et al. . |
| 3,494,145 | 2/1970 | Davis et al. . |
| 3,877,246 | 4/1975 | Schutze . |
| 3,934,424 | * 1/1976 | Goldsberry ................................. 62/87 |
| 4,550,573 | * 11/1985 | Rannenberg .......................... 62/172 |
| 4,967,565 | 11/1990 | Thomson et al. . |
| 5,086,622 | 2/1992 | Warner . |

FOREIGN PATENT DOCUMENTS

| 0 019 492 | 11/1980 | (EP) . |
| 0 888 966 | 1/1999 | (EP) . |
| WO 99/02399 | 1/1999 | (WO) . |
| WO 99/02400 | 1/1999 | (WO) . |
| WO 99/24318 | 5/1999 | (WO) . |

* cited by examiner

*Primary Examiner*—Corrine McDermott
*Assistant Examiner*—Malik N. Drake
(74) *Attorney, Agent, or Firm*—Christie, Parker & Hale, LLP

(57) ABSTRACT

An air-conditioning system in particular for aircraft is proposed wherein pressuized, moisture-containing air is conditioned for air-conditioning the cabin. The pressurized air is compressed further in two separate stages, dehumidified in a high-pressure water extraction cycle and subsequently expanded in one or two turbine stages. Depending on the design one can thereby achieve ice-free conditioned air or a high efficiency of the air-conditioning-system, in particular if two turbine stages are provided and the energy gained in the particular turbine stages is utilized regeneratively, distributed over the compressor stages.

15 Claims, 4 Drawing Sheets

AIR-CONDITIONING SYSTEM FOR AIRPLANE CABIN

This invention relates to an air-conditioning system for conditioning moisture-containing, pressurized air for air-conditioning a room, in particular for air-conditioning airplane cabins, and to a corresponding method.

Fresh air for air-conditioning airplane cabins is conditioned from the air (known as bleed) bled off the engine at high pressure and high temperature. Air-conditioning systems draw the necessary cooling power out of the pressure and temperature potential of the engine air. In the course of the fresh-air conditioning process the bleed is cooled, dehumidified and expanded to the cabin pressure of 1 bar in ground operation or about 0.8 bars in flight operation. Special value is attached in fresh-air conditioning to dehumidification in order to prevent icing of individual components of the air-conditioning system and ice crystallization in the fresh air to be conditioned. The necessity of dehumidification exists mainly in ground operation. however, because in flight operation. i.e. at high altitudes, ambient air and thus the bled-off engine air is already extremely dry.

With reference to FIG. 4 an air-conditioning system will be described in the following as is used in present-day Airbus and Boeing passenger airplanes, for example the A330/340 and Boe 757/767.

Via flow control valve FCV the amount of bleed required for supplying fresh air to the cabin is bled off an engine at about 2 bars and 200° C. In ground operation bleed is withdrawn from an auxiliary engine at about 3 bars. The bleed is first passed through primary heat exchanger PHX and cooled to about 100° C. Then the bleed is compressed further in compressor C to about 4.5 bars and 160° C. and cooled again to about 45° C. in main heat exchanger MHX. The high pressure of 4.5 bars is necessary to be able to realize a high degree of dehumidification in the following water extraction cycle. This air cycle system is therefore also known as a "high-pressure water extraction cycle".

The high-pressure water extraction cycle comprises condenser CON, as proposed in EP 0 019 493 A3, and water extractor WE following condenser CON. Compressed, cooled bleed is cooled in condenser CON by about $\Delta Y=-15K$, condensed water is then extracted in water extractor WE, and the thus dehumidified air is subsequently expanded in turbine T to the cabin pressure of about 1 bar, the temperature at the turbine outlet being about −30° C. Thus conditioned bleed, before being mixed as fresh air with recirculated cabin air in a mixing chamber, is passed through condenser CON of the high-pressure water extraction cycle in heat-exchanging fashion in order to cool the compressed, cooled bleed to the temperature necessary for water extraction in water extractor WE. Air expanded in turbine T and cooled is thereby accordingly heated again by $\Delta T=+15K$ to about −15° C.

The conditioned air is then mixed with recirculated cabin air in a mixing chamber (not shown). Temperature control valve TCV can be used to increase the temperature at the turbine outlet to obtain an optimum mixing temperature with the admixed, recirculated cabin air. For this purpose part of the bleed precooled in primary heat exchanger PHX is branched off and resupplied to the conditioned air stream after turbine T.

The high-pressure water extraction cycle has. in addition to condenser CON, heat exchanger REH (reheater) preceding condenser CON. Compressed cooled bleed is first passed through heat exchanger REH before entering condenser CON, and subsequently the dehumidified air is passed through heat exchanger REH before entering turbine T. Heat exchanger REH has substantially the function of heating the dehumidified air by about $\Delta T=5K$ and vaporizing residual moisture while simultaneously recovering energy before air enters the turbine. Residual moisture in the form of fine droplets can destroy the turbine surfaces since air almost reaches the speed of sound in turbine T. A second function of heat exchanger REH is to relieve condenser CON by cooling compressed, cooled bleed before it enters condenser CON by $\Delta T=-5K$.

It is typical of such an air-conditioning system that the energy gained in turbine T is used to drive compressor C, on the one hand, and fan F, on the other. All three wheels, that is turbine/compressor/fan, are disposed on a common shaft and form air cycle machine ACM, also known as a three-wheel machine Fan F conveys a cooling air stream branched off from ambient air through a cooling shaft in which primary and main heat exchangers PHX, MHX are disposed. Fan F must be driven actively by turbine T in particular in ground operation. In flight operation ram air suffices, it being optionally throttled by a valve at the cooling shaft inlet.

The overall system is designed for ground operation at an ambient temperature of 38° C. In order to optimize the effectiveness of the heat-exchange process in the cooling shaft, water gained in the high-pressure water extraction cycle is supplied at a temperature of about T=20° C. and a pressure of 3.5 bars in the cooling shaft inlet in fine droplets to be vaporized therein, thereby improving the effectiveness of the heat exchangers. In case air cycle machine ACM fails completely, for example because the necessary mass flow rate of compressed air is not attainable for fulfilling the parameters necessary for the system to work, bypass valve BPV is provided for bypassing turbine T. In this case check valve CV opens automatically since an overpressure triggering check valve CV builds up before compressor C as turbine T is not driven. The opening of check valve CV causes compressor C to be bypassed or "short-circuited". In this state, fresh air is supplied directly through primary and main heat exchangers PHX, MHX to the mixing chamber following the air-conditioning system to be mixed with recirculated cabin air.

As mentioned at the outset, icing in the conditioned fresh air is a problem. In order to avoid icing, anti-icing valve AIV is provided for directly branching off part of the air bled off the engine and resupplying it to the conditioned air stream after turbine T. A further way of avoiding ice is to design the turbine such that no temperatures below 0° C. occur at the turbine outlet. However, this latter variant requires much more energy if the same cooling power is to be reached. Therefore, it is preferable to supply hot air at the turbine outlet.

An improved variant of this air-conditioning system provides that air cycle machine ACM is extended by a second turbine. This makes the three-wheel machine, turbine/compressor/fan, into a four-wheel machine, turbine/turbine/compressor/fan (U.S. Pat. No. 5,086,622). The second turbine is disposed on a common shaft with the other wheels in order to recycle the energy gained by the turbines into the air-conditioning system, as in the conventional three-wheel system. The second turbine supplements the first turbine such that air dehumidified in the high-pressure water extraction cycle is expanded in two stages, the condenser of the high-pressure water extraction cycle being disposed with the air pipe between the two turbines in heat-exchanging fashion. This is more favorable energetically than the conventional structure of the air-conditioning system because air exiting the first turbine is comparatively warm, preferably above 0° C. to avoid ice, and this air is heated in condenser CON by for example ΔT=+15 Kelvin to a comparatively high energy level, so that the second turbine can utilize this high energy level to gain energy which gets lost in the conventional system. This system is known in expert circles as a "condensing cycle".

The problem of the present invention is to adapt the above-described air-conditioning system or method so that it can be designed more flexibly and the overall efficiency optimized more easily, in particular to make it adaptable to the particular system requirements more flexibly and therefore better energetically through a greater number of freely selectable system parameters.

A further problem is to provide an air-conditioning system and method with which one can reduce icing during air conditioning.

A further problem is to improve overall efficiency over known systems and methods.

Yet a further problem is to be seen in increasing overall efficiency in particular in flight operation.

These problems are solved by the air-conditioning system and method having the features stated in the independent patent claims and claims dependent thereon.

It is essential to the invention that compression of bleed is effected in two stages. One of the two compression stages procures the energy required for compression in conventional fashion by regenerative utilization of energy gained during expansion of dehumidified air. For this purpose one of the two compressor wheels is disposed on a common shaft with a turbine wheel, for example, so that compressor wheel and turbine wheel, optionally with a fan wheel in addition, form a (first) two- or three-wheel air cycle machine. The compressor wheel of the first compression stage is preferably disposed on a common shaft with the turbine wheel, but it can also be the compressor wheel of the second compressor stage. The other compressor wheel can be driven with energy external to the system for example. This makes it possible to design the (first) air cycle machine such that the compressor and turbine disposed on a common shaft have comparatively high efficiency. This initially results in the compressor power of the air cycle machine being below the compressor power necessary for bringing the engine air to be conditioned to the pressure necessary for air dehumidification. The lacking compressor power is therefore provided by the additional compressor stage. This permits the air-conditioning system to be designed flexibly and the overall efficiency optimized easily.

Due to the second compressor stage it is in particular possible to produce ice-free conditioned air. The invention exploits the fact that at a given temperature the amount of water condensing out of air increases with rising pressure. Since the temperature can only be influenced within limits due to the system, in particular because compressed engine air cooled in the main heat exchanger cannot be cooled below ambient temperature in the cooling shaft (designed for 38° C. ambient temperature), a comparatively high compression pressure of ≧4.6 bars can be produced with the additional compressor stage to reach the desired high degree of condensation in the high-pressure water extraction cycle. Freedom from ice is reached e.g. at −10° C. and 1 bar with <1.8 g of water per kilogram of dry air.

Instead of having a power source external to the system for the additional compressor, one can also operate the latter regeneratively by effecting not only compression of bleed but also expansion of dehumidified air in two stages, for example in two separate turbines, and utilizing the energy delivered by the turbines for the first compressor stage, on the one hand, and for the second compressor stage, on the other. The air-conditioning system then comprises two machines each having at least a compressor wheel and a turbine wheel on a common shaft. Additionally the fan can be disposed on one shaft and a motor on the other shaft, whereby the motor can also be designed as a generator.

Disposing the compressor and turbine wheels on two separate shafts or in two separate machines permits much more flexible design of the overall system than conventional air-conditioning systems. One attains an optimum design in particular of compressor and turbine.

Freedom from ice can be obtained without any problem in particular when not only compression of bleed but also condensation of moisture contained in the air is effected in two stages in the high-pressure water extraction cycle. For this purpose a first condenser of the high-pressure water extraction cycle is disposed for heat exchange with dehumidified air before the turbine inlet, in case of two-stage expansion before the second turbine inlet, and a second condenser of the high-pressure water extraction cycle for heat exchange with dehumidified and expanded air after the turbine outlet, compressed air being passed through said condensers in heat-exchanging fashion in order to condense water and then extract it. Effectiveness of dehumnidification is increased substantially by two-stage condensation. This holds in particular when expansion is also effected in two turbine stages.

When small amounts of ice in the cooling air are no great problem and high efficiency of the overall system is important, it is advantageous to combine two-stage compression with two-stage expansion, compressed air being passed in heat-exchanging fashion through a condenser disposed between first and second turbines to extract moisture. Efficiency can be further improved if dehumidified air is guided past compressed, not yet dehumidified air in heat-exchanging fashion in a reheater before entering the first turbine stage. This relieves the condenser, on the one hand, since compressed air is precooled before entering the condenser. On the other hand, any residual moisture contained in the dehumidified air is vaporized before the first turbine inlet so that the turbine surfaces are protected from being destroyed by water drops. In terms of efficiency this variant is to be ranked the most favorable.

The invention offers the further advantage that it is possible to switch off the additional compressor stage and optionally the turbine stage driving said compressor stage by means of suitable bypass circuits. This is useful in particular in flight operation, when air moisture and freedom from ice of the cooling air play no part so that high compression for the high-pressure water extraction cycle is unnecessary. In flight operation one can completely switch off one of the two machines by opening and/or closing valves, thereby avoiding unnecessary losses and therefore increasing efficiency in flight operation.

Designing the air-conditioning system with two separate machines each comprising compressor and turbine wheel on a common shaft, one of which can be switched off in flight operation, offers further advantages resulting from the fact that a greater pressure ratio is available in ground operation than in flight operation due to the system. This makes it energetically favorable to provide a relatively small turbine nozzle (baffle screen cross section) in ground operation. Said small nozzle is realized by connecting the two turbine stages in series, resulting in a "total nozzle" smaller than each individual nozzle. In flight operation about the same volume flow is required for air-conditioning the airplane cabin despite a lower available pressure ratio, however, so that in flight operation a large nozzle would be necessary for about the same air flow. Since one machine and thus one turbine stage is turned off for the overall system in flight operation a large nozzle results by reason of the sole remaining turbine or the second turbine stage for the overal system. One can thus increase efficiency in flight operation. This gain in efficiency is preferably utilized for designing the primary and main heat exchangers with Minimal overall size and weight, under the constraint that the necessary volume flow rate is just met. In the final effect one can thus achieve a smaller overall size and thus lower total weight of the air-conditioning system by the measure of providing two machines instead of only one machine.

A further advantage resulting when the air-conditioning system has two separate machines each with a coupled compressor and turbine is that if one machine fails at least the other machine still works and the air-conditioning system can be operated further without restriction. With the redundancy required for aircraft, this means that one fewer air conditioner or "pack" per aircraft is necessary, for example only two packs instead of three. As a consequence, the accordingly lower number of components decreases weight, increases the reliability of the installation and reduces expense for maintenance and repair.

Finally, it is to be ascertained that both in ground operation with two machines and in flight operation with one switched-off machine the energy gained during expansion in the turbine or turbines is largely recovered via the two compressor stages (ground operation) or the sole remaining compressor stage (flight operation).

In the following the invention will be described by way of example with reference to FIGS. 1 to 3, in which.

Figure 1:
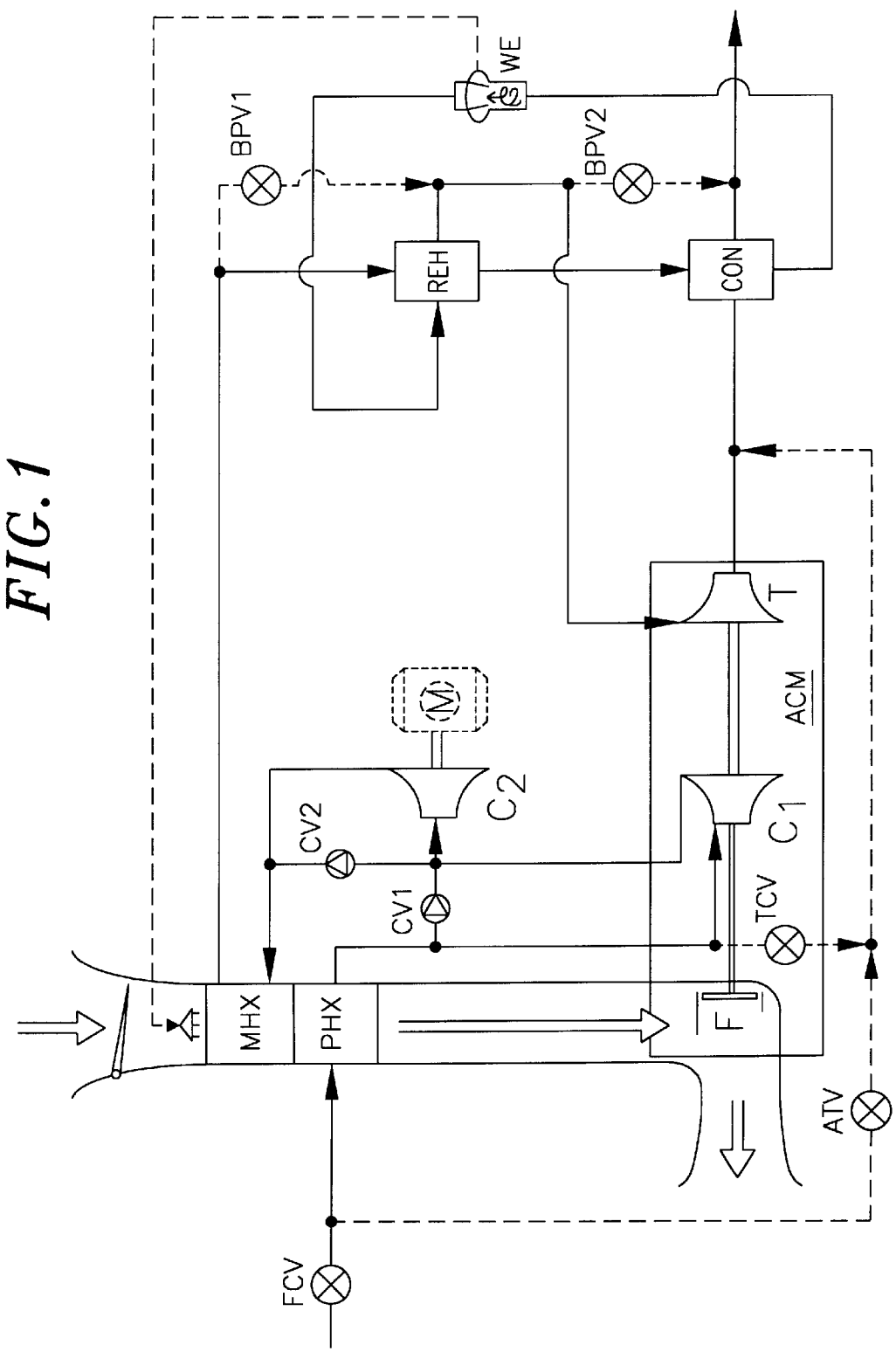
FIG. 1 shows a diagram of an inventive air-conditioning system.
Figure 4:
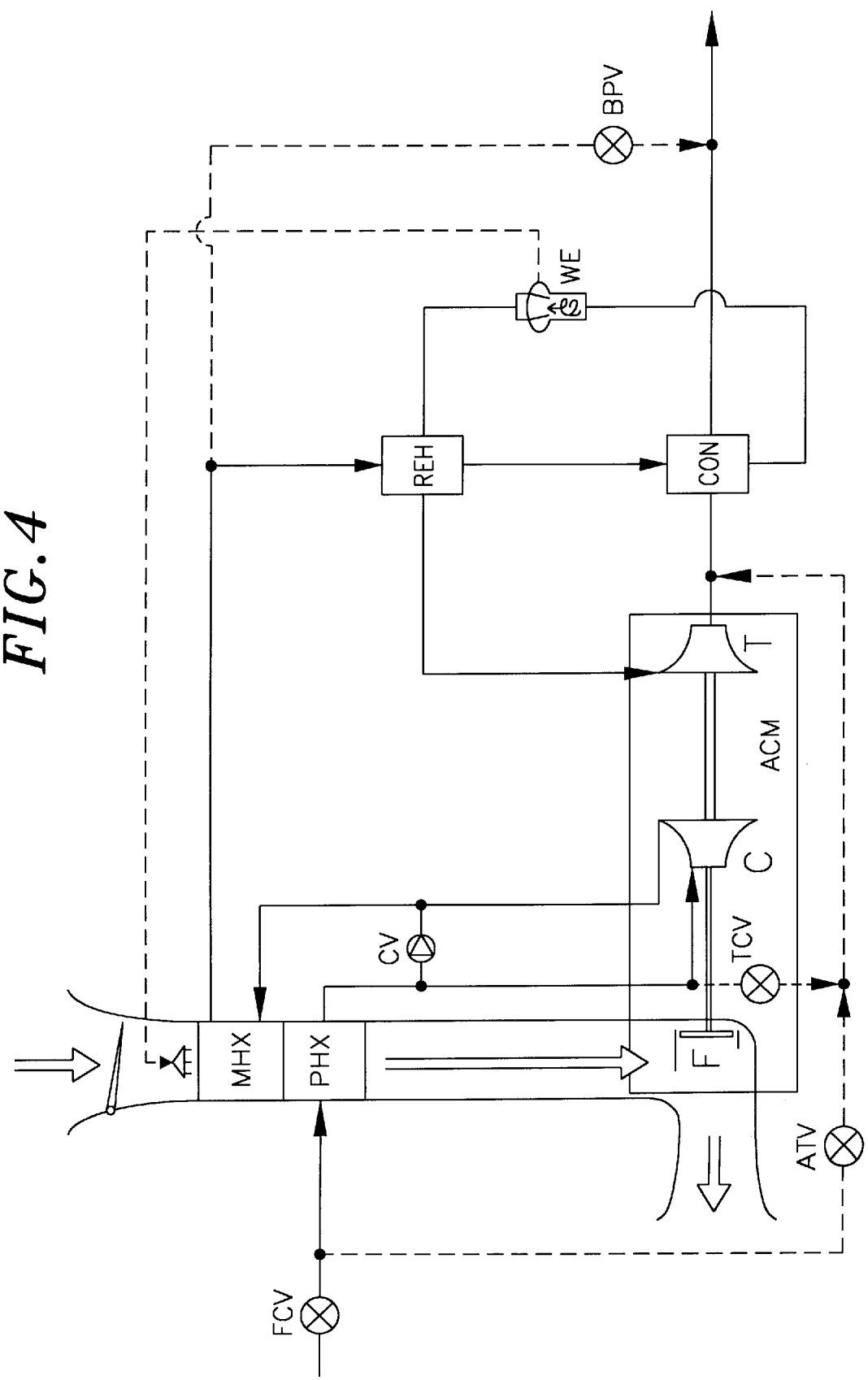
FIG. 4 shows an air-conditioning system according to the prior art.

FIG. 1 shows an air-conditioning system differing from the air-conditioning system described in FIG. 4 with respect to the prior art substantially in that two compressors C1 and C2 are provided in order to bring bleed cooled in primary heat exchanger PHX to the pressure necessary for high-pressure water extraction. Compressors C1 and C2 are to be designed depending on whether freedom from ice or high efficiency of the air-conditioning system is more important. In FIG. 1, compressor C1 of the first compressor stage together with turbine T and fan F form three-wheel machine ACM. That is, compressor C1 and fan F are driven regeneratively by energy gained in turbine T. Compressor C2 of the second compression stage is operated by separate motor M, i.e. by external energy. Check valve CV2 opens automatically when compressor C2 is blocked or when motor M of compressor C2 is not switched off in flight operation for example. Check valve CV1 opens automatically when air cycle machine ACM is blocked or bypass valve BPV2 is actively opened.

The air-conditioning system schematically shown in FIG. 1 otherwise corresponds fundamentally in structure and function to the system of FIG. 4, whereby it should be taken into account that the reheater is not absolutely necessary but of great advantage in particular in case absolute freedom from ice is to be achieved.

Figure 2:
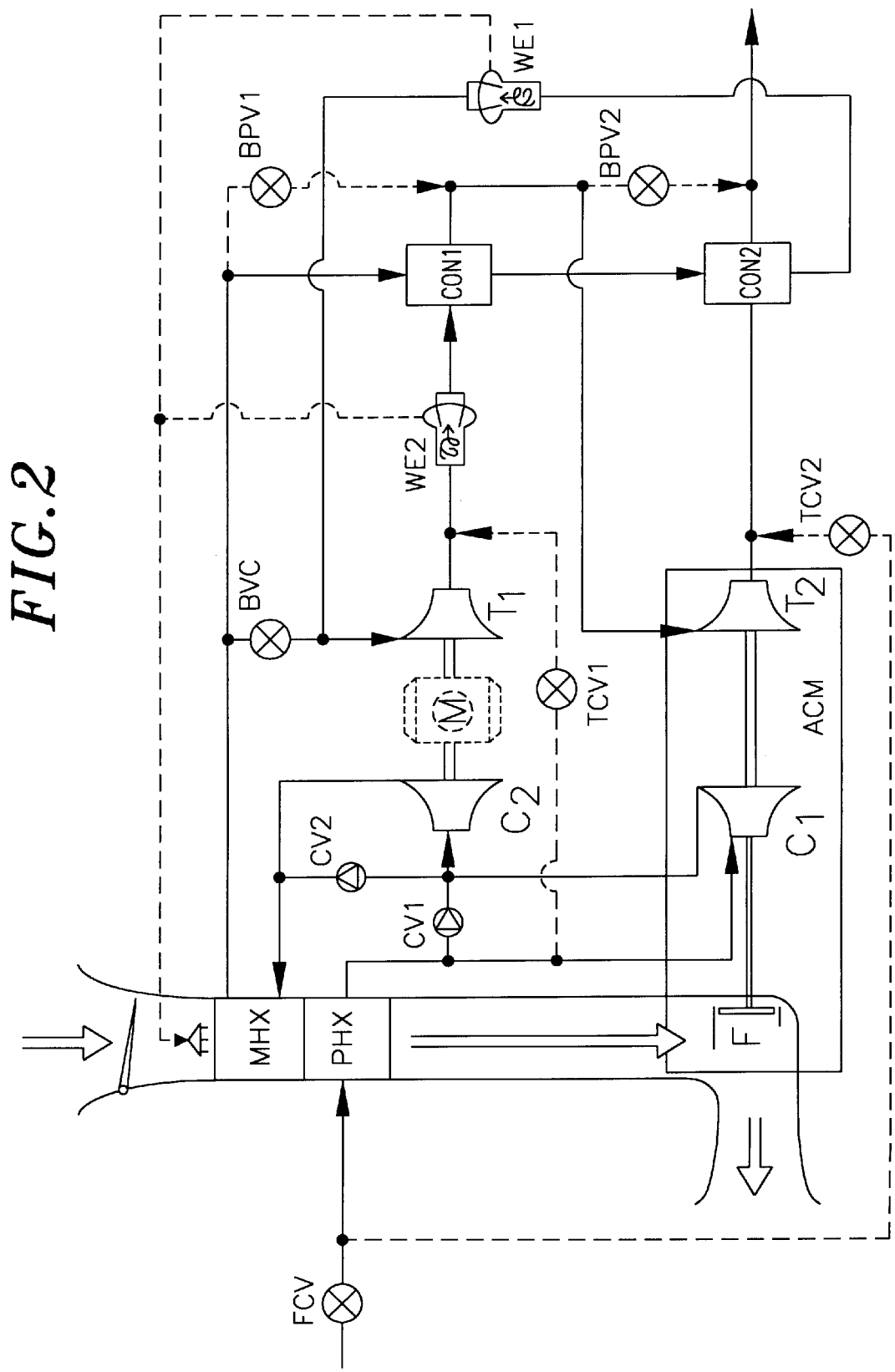
FIG. 2 shows a diagram of an improved embodiment of the system of FIG. 1, in particular for producing ice-free conditioned air.

FIG. 2 shows a further development of the invention. In the air-conditioning system shown schematically therein, dehumidified air is expanded in two stages via turbines T1 and T2. Energy gained during expansion in turbine T1 is utilized regeneratively to drive compressor C2, while energy delivered by turbine T2 is utilized regeneratively by compressor C1, as before. In addition to condenser CON in the high pressure dewatering cycle, through which condensed bleed is guided in heat-exchanging fashion past dehumidified air expanded in turbine T1, second condenser CON2 is provided through which air precooled in condenser CON1 is guided in heat-exchanging fashion past air expanded by turbine T2 Condensers CON1 and CON2 are especially advantageous when conditioned air is to be free from ice. Otherwise one can do without condenser CON2, which one does in particular when high efficiency of the overall system is to be achieved.

Before air expanded in the first turbine stage enters condenser CON1, water extractor WE2 is advantageously provided in addition to water extractor WE1 provided in the high-pressure water extraction cycle. Extracted water is supplied to ram-air heat exchangers MHX/PHX to be vaporized therein. Water extractor WE2 is advantageous in particular when air cycle machine ACM is blocked since the effectiveness of first water extractor WE1 is greatly restricted here.

Further, one can open economy valve ECV to switch off the high-pressure water extraction cycle, which is useful in particular when air cycle machine ACM fails and not enough pressure is available for energetically suitable utilization of the high-pressure water extraction cycle. Water extraction is then effected at low pressure by water extractor WE2. Condensers CON1 and CON2 are inoperative in this case.

As in the air-conditioning system described above, one can switch off the machine comprising turbine T1 and compressor C2 in particular for flight operation by opening bypass valve BPV1. By opening bypass valve BPV2 one can also bypass air cycle machine ACM, in particular if it fails.

FIG. 2 shows optional motor M, with which the efficiency of the system can be optimized, by dotted lines on the shaft interconnecting turbine T1 and compressor C2. One can either make additional energy available to the system. Or, and in particular, one can utilize the motor as a generator in order to supply surplus energy to the board wiring.

Figure 3:
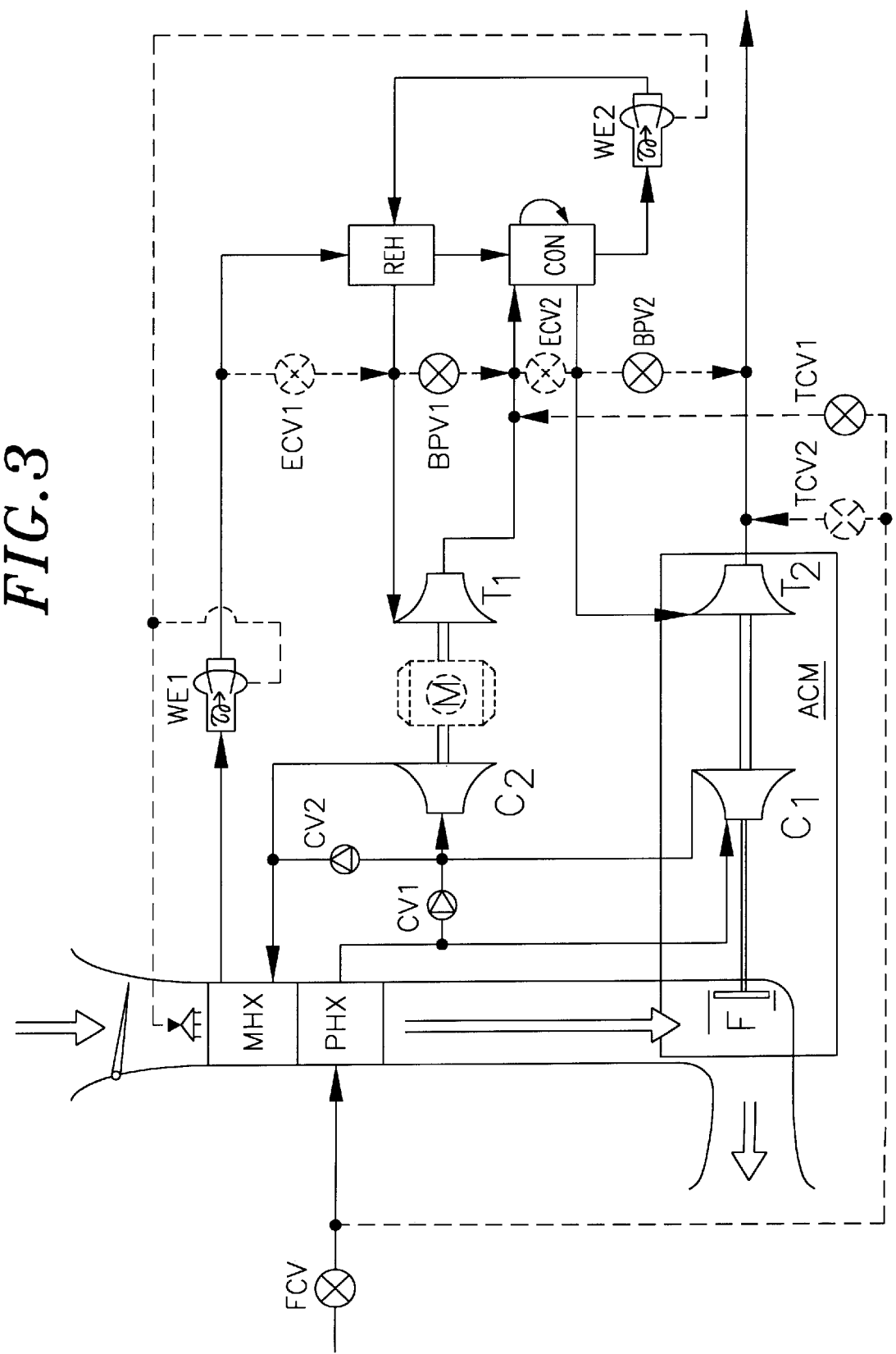
FIG. 3 shows a diagram of an improved embodiment of the system of FIG. 1 with improved efficiency.

While the air-conditioning system shown in FIG. 2 is in particular suitable for providing ice-free conditioned air, FIG. 3 schematically shows an air-conditioning system having especially favorable efficiency. As described with respect to FIG. 4 (prior art), reheater REH is disposed before turbine T1 and condenser CON after turbine T1 in heat-exchanging fashion for compressed air to flow through and for condensation of moisture contained therein. Reheater REH can fundamentally be omitted, but is advantageous for the reasons stated above. Moisture contained in compressed air is condensed in condenser CON at a comparatively high energy level, in contrast to the prior art described in FIG. 4, whereby this energy can be utilized in turbine T2 as fundamentally proposed in U.S. Pat. No. 5,086,622. However, in U.S. Pat. No. 5,086,622 turbines T1 and 2 are disposed jointly with compressor C1 and fan F on a common shaft in a single air cycle machine ACM. Since according to the invention compression is divided into two stages, and turbine T1 plus compressor C2 and turbine T2 plus compressor C1 each form separate machines, efficiency can be increased further because the design of the air-conditioning system is altogether more variable.

As described in FIG. 2, economy valves ECV1 and ECV2 serve optionally to bypass the high-pressure water extraction cycle. By opening bypass valve BPV1 one bypasses the machine comprising turbine T1 and compressor C2 in flight operation. Bypass valve BPV2 accordingly serves to bypass air cycle machine ACM if it fails. Both bypass valves can also be used optionally as temperature control valves. Temperature control valve TCV2 is likewise optional, while temperature control valve TCV4 should preferably be provided in the air-conditioning system. As mentioned above, one can actually omit reheater REH, but it is advantageous for the reasons stated at the outset.

Depending on the system requirement and/or to simplify the system, individual valves can be omitted, as mentioned above, or they can be partly combined. In particular one can for example combine valves ECV1 BPV1 and ECV2 into one line with only one valve, resulting in a less complex system altogether. The installation is then optimized for flight operation with a switched-off machine (turbine T1/compressor C2).

What is claimed is:

1. A method for conditioning moisture-containing, pressurized air for air-conditioning a room, comprising:

compressing the pressurized air to a higher pressure;

dehumidifying the compressed air by condensing and extracting water from the compressed air;

expanding the dehumidified air to a lower pressure;

passing on the conditioned air for air-conditioning a room;

wherein regenerated process energy is utilized in the other of the two compression stacs; and wherein expansion of the air is effected in two separate stages by means of first and second turbines, and the energy gained with the first turbine is utilized regeneratively at least partly in the second compression stage and the energy gained with the second turbine at least partly in the first compression stage, or vice versa.

2. A method according to claim 1, wherein water is extracted from the air after expansion of the air in the first turbine stage and before expansion of the air in the second turbine stage.

3. A method according to either of claims 1 or 2, wherein in the condensation step the compressed air is guided in heat-exchanging fashion past the air expanded by the first turbine stage, and cooled.

4. A method according to claim 3, wherein the condensation step is performed in two stages by the compressed air also being guided in heat-exchanging fashion past the air expanded by the second turbine stage, and cooled.

5. A method according to claim 4, wherein the air is guided in heat-exchanging fashion past the compressed air, and heated, after dehumidification and before expansion.

6. A method according to claim 1, wherein at least part of the energy gained during expansion in one of the two turbines is converted into electric energy and removed, and at least part of the energy gained during expansion in the other of the two turbines is utilized to drive a fan (F).

7. An air-conditioning system for conditioning moisture-containing, pressurized air for air-conditioning a room, the system a compressor device for compressing the pressurized air to a higher pressure;

a condenser and following water extractor for dehumidifying the compressed air;

an expansion device for expanding the dehumidified air to a lower pressure;

an output line for passing on the conditioned air for air-conditioning a room;

wherein the compressor device is of two-stare construction and comprises first and second separately driven compressors, and the expansion device comprises a first turbine coupled with one of the two compressors for driving the same; and wherein the expansion device is of two-stage design and comprises a second turbine coupled with the other of the two compressors for driving the same.

8. An air-conditioning system according to claim 7, characterized in that a water extractor (WE2) is disposed between the two turbines (T1, T2).

9. An air-conditioning system according to either of claims 7 or 8, wherein a first heat exchanger (CON; CON1), through which the compressed air is passed in heat-exchanging fashion and cooled, is disposed between the two turbines (T1, T2).

10. An air-conditioning system according to claim 9, wherein a second heat exchanger (CON2), through which the compressed air is passed in heat-exchanging fashion and cooled, is disposed after the second turbine (T2).

11. An air-conditioning system according to claim 7, wherein a second or third heat exchanger (REH), through which the dehumidified air is passed and heated, is disposed before the first turbine.

12. An air-conditioning system according to claim 7, wherein a by-pass device (CV2) is provided for bypassing the other of the two compressors (C2).

13. An air-conditioning system according to claim 7, wherein a by-pass device (BPV1) is provided for bypassing the first turbine (T1).

14. An air-conditioning system according to claim 7, wherein a bypass device (CV1; BPV2) is provided for bypassing one of the two compressors (C1).

15. An air-conditioning system according to claim 7, wherein a generator (M) coupled with one of the two turbines (T1) and producing a removing energy is provided, and wherein a fan (F) coupled with the other of the two turbines (T2) and driven thereby is provided.

* * * * *

UNITED STATES PATENT AND TRADEMARK OFFICE
CERTIFICATE OF CORRECTION

PATENT NO. : 6,199,387 B1
DATED : March 13, 2001
INVENTOR(S) : Alfred Sauterleute It is certified that error appears in the above-identified patent and that said Letters Patent is hereby corrected as shown below:

Title page,
Item [57], ABSTRACT,
Line 2, replace "pressuized," with -- pressurized --.

Column 7,
Line 29, replace "stacs" with -- stages --.

Column 8,
Line 5, after "system" insert -- comprising: --.
Line 14, replace "two-stare" with -- two-stage --.

Signed and Sealed this

Eleventh Day of February, 2003

JAMES E. ROGAN
*Director of the United States Patent and Trademark Office*